United States Patent
Bruwer et al.

(10) Patent No.: US 10,275,055 B2
(45) Date of Patent: Apr. 30, 2019

(54) ROTATIONAL SENSING

(71) Applicant: AZOTEQ (PTY) LTD, Paarl (ZA)

(72) Inventors: Frederick Johannes Bruwer, Paarl (ZA); Daniel Barend Rademeyer, Paarl (ZA); Regardt Busch, Paarl (ZA); Riaan Du Toit, Paarl (ZA); Jacobus Daniel Van Wyk, Paarl (ZA)

(73) Assignee: AZOTEQ (PTY) LTD, Paarl (ZA)

( * ) Notice: Subject to any disclaimer, the term of this patent is extended or adjusted under 35 U.S.C. 154(b) by 75 days.

(21) Appl. No.: 15/476,384

(22) Filed: Mar. 31, 2017

(65) Prior Publication Data

US 2017/0285768 A1   Oct. 5, 2017

(30) Foreign Application Priority Data

Mar. 31, 2016 (ZA) .................................. 201602182
Dec. 14, 2016 (ZA) .................................. 201608615

(51) Int. Cl.
*G06F 3/038* (2013.01)
*G01D 5/20* (2006.01)
*G06F 3/0362* (2013.01)
*G06F 3/0354* (2013.01)

(52) U.S. Cl.
CPC ............... *G06F 3/038* (2013.01); *G01D 5/20* (2013.01); *G06F 3/0362* (2013.01); *G06F 3/03543* (2013.01)

(58) Field of Classification Search
None
See application file for complete search history.

(56) References Cited

U.S. PATENT DOCUMENTS

| | | |
|---|---|---|
| 2,725,504 A | 11/1955 | Dunlap |
| 3,184,620 A | 5/1965 | Leibowitz et al. |
| 3,192,471 A | 6/1965 | Kuhrt et al. |
| 3,365,594 A | 1/1968 | Davidson |
| 3,530,317 A | 9/1970 | Lang |
| 3,663,843 A | 5/1972 | Smith |
| 3,835,373 A | 9/1974 | Matula |
| 4,158,216 A | 6/1979 | Bigelow |
| 4,356,732 A | 11/1982 | Hachtel et al. |
| 4,406,999 A | 9/1983 | Ward |
| 4,507,638 A | 3/1985 | Brosh |
| 4,737,698 A | 4/1988 | McMullin et al. |

(Continued)

FOREIGN PATENT DOCUMENTS

| | | |
|---|---|---|
| EP | 0 365 758 B1 | 10/1992 |
| EP | 0 896 207 A1 | 2/1999 |
| EP | 0 805 339 B1 | 11/2002 |

*Primary Examiner* — Kenneth B Lee, Jr.
(74) *Attorney, Agent, or Firm* — Mattingly & Malur, PC (57) ABSTRACT

Improved means and methods to sense rotation using magnetic field sensors, inductance sensing and capacitive sensing employ a user interface comprising a knob and an integrated circuit containing a magnetic field sensor and inductance measuring circuitry. A permanent magnet and a metal member are attached to the knob, allowing detection of rotation of the knob and when the knob is depressed. A first press is interpreted as an activation command, a subsequent rotation is detected, indicated and stored, a second press is interpreted as a deactivation command and a third press is interpreted as a command to reactivate and automatically select a specific rotational position.

15 Claims, 7 Drawing Sheets

(56) References Cited

U.S. PATENT DOCUMENTS

| | | |
|---|---|---|
| 4,777,436 A | 10/1988 | Fiori |
| 4,950,922 A | 8/1990 | Krummer |
| 5,083,468 A | 1/1992 | Dobler et al. |
| 5,109,193 A | 4/1992 | Pike |
| 5,126,665 A | 6/1992 | Hachtel et al. |
| 5,170,313 A | 12/1992 | Miller et al. |
| 5,200,698 A | 4/1993 | Thibaud |
| 5,521,494 A | 5/1996 | Hore et al. |
| 5,534,849 A | 7/1996 | McDonald et al. |
| 5,583,541 A | 12/1996 | Solhjell |
| 5,712,621 A | 1/1998 | Andersen |
| 5,786,997 A | 7/1998 | Hoyt et al. |
| 5,880,586 A | 3/1999 | Dukart et al. |
| 5,903,205 A | 5/1999 | Goto et al. |
| 5,911,627 A | 6/1999 | Piot et al. |
| 5,939,879 A | 8/1999 | Wingate et al. |
| 6,198,275 B1 | 3/2001 | Wolf et al. |
| 6,304,076 B1 | 10/2001 | Madni et al. |
| 6,587,093 B1 | 7/2003 | Shaw et al. |
| 6,611,139 B1 | 8/2003 | Jackson |
| 6,612,404 B2 | 9/2003 | Sweet et al. |
| 6,825,831 B1 | 11/2004 | Passaro |
| 6,831,456 B2 | 12/2004 | Doescher |
| 6,850,054 B2 | 2/2005 | Kjellin et al. |
| 6,911,895 B2 | 6/2005 | Mayr et al. |
| 6,969,988 B2 | 11/2005 | Kakuta et al. |
| 7,016,744 B2 | 3/2006 | Howard et al. |
| 7,053,602 B2 | 5/2006 | Jin et al. |
| 7,183,761 B2 | 2/2007 | Watanabe et al. |
| 7,196,604 B2 | 3/2007 | Sills et al. |
| 7,212,189 B2 | 5/2007 | Shaw et al. |
| 7,235,968 B2 | 6/2007 | Popovic et al. |
| 7,538,282 B2 | 5/2009 | Tomaki et al. |
| 7,782,047 B2 | 8/2010 | Mattson |
| 7,944,215 B2 | 5/2011 | Howard et al. |
| 8,020,453 B2 | 9/2011 | Kreit et al. |
| 8,026,898 B2 | 9/2011 | Sutardja |
| 8,154,404 B2 | 4/2012 | Diener et al. |
| 8,314,610 B2 | 11/2012 | Urano et al. |
| 8,395,395 B2 | 3/2013 | Bruwer et al. |
| 8,659,306 B2 | 2/2014 | Bruwer et al. |
| 8,664,945 B2 | 3/2014 | Laville et al. |
| 8,847,892 B2 | 9/2014 | Kreit et al. |
| 9,035,731 B2 | 5/2015 | Brandl et al. |
| 9,161,425 B2 | 10/2015 | Burayez et al. |
| 9,360,510 B2 | 6/2016 | Bruwer et al. |
| 9,366,547 B2 | 6/2016 | Forsyth et al. |
| 9,709,614 B2 | 7/2017 | Bruwer et al. |
| 2002/0093328 A1 | 7/2002 | Maatta et al. |
| 2007/0053522 A1 | 3/2007 | Gallion et al. |
| 2007/0139195 A1 | 6/2007 | Jin et al. |
| 2009/0009491 A1 | 1/2009 | Grivna |
| 2009/0064809 A1 | 3/2009 | Miret et al. |
| 2009/0102460 A1 | 4/2009 | Schott et al. |
| 2010/0253653 A1 | 10/2010 | Stambaugh et al. |
| 2010/0308808 A1 | 12/2010 | Yamagata et al. |
| 2011/0187204 A1 | 8/2011 | Lacey et al. |
| 2013/0021023 A1 | 1/2013 | Niwa et al. |
| 2013/0176020 A1 | 7/2013 | Chauvin et al. |
| 2014/0247040 A1 | 9/2014 | Reitsma et al. |
| 2015/0102746 A1 | 4/2015 | Hunt et al. |
| 2016/0224133 A1 | 8/2016 | Perret-Gentil |
| 2016/0282966 A1* | 9/2016 | Liu .................. G06F 3/0383 |

* cited by examiner

ROTATIONAL SENSING

BACKGROUND OF THE INVENTION

There are many applications for robust, accurate, low current and as always cost effective rotational sensor solutions.

Figure 1:
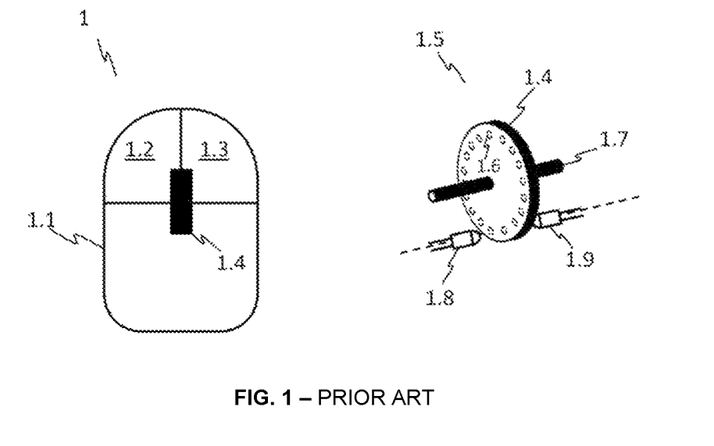
FIG. 1 shows a computer mouse and a prior art optical rotation sensing solution

In computer mouse applications, optical sensor solutions have been very popular and in many automotive applications magnetic (Hall) sensors have been used. A large number of these applications are digital by nature, for example one or multiple holes are positioned in a wheel (keyed) to determine the rotation and direction, and also speed if measured against time. FIG. 1 illustrates a prior art optical sensing solution for a computer mouse at 1. In a large number of prior art mice, as presented by 1.1, in addition to left 1.2 and right 1.3 buttons, a user may use a wheel 1.4 to navigate within an associated display. Typically, said wheel 1.4 revolves around an axle 1.7, and has an LED 1.8 and a photo diode or photo transistor 1.9 located on either side of it. A number of holes 1.6 is located around the wheel circumference, and allows infra-red or visible light to travel from the LED to the photo diode or transistor. As the wheel is rotated, light is alternately blocked or allowed to pass, with the resultant signal used to monitor rotation.

Figure 2:
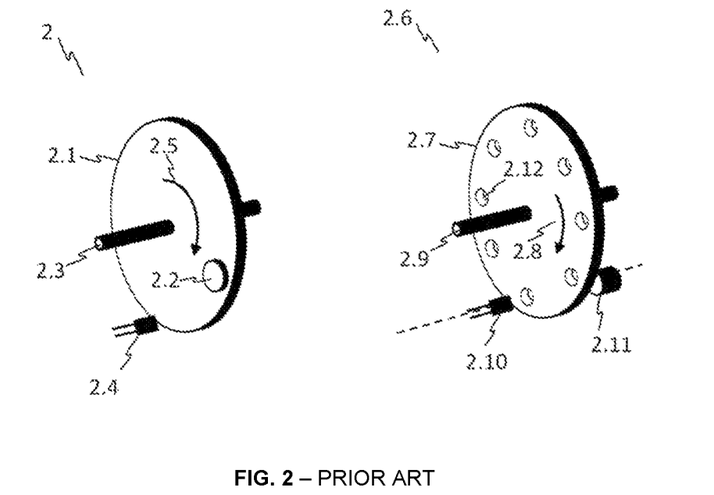
FIG. 2 shows prior art magnetic sensor based rotation sensing solutions.

Hall sensors may be employed to monitor a magnetic field passing the sensor. This may be done with a single magnet passing once per revolution, or with multiple magnets to increase resolution. Another prior art implementation uses a single magnet with a plate attached to a wheel that generally shields the magnet from the Hall sensor, except at certain points around the wheel. This is effectively the same concept as that used by the optical solution. FIG. 2 illustrates these prior art concepts. At 2, a single magnet 2.2 is attached to a wheel 2.1 which rotates in direction 2.5 around an axle 2.3. A Hall sensor 2.4 is used to monitor the number of revolutions, with the Hall sensor output typically at a maximum when said magnet is adjacent to it. Such a solution can only determine rotational movement at a resolution of one turn, and can typically not be used to determine rotation direction. At 2.6, a wheel 2.7 which revolves in direction 2.8 around axle 2.9, and which absorbs magnetic fields to some extent, is shown. Wheel 2.7 is perforated with holes 2.12 about its circumference. A Hall sensor 2.10 and a permanent magnet 2.11 are aligned with each other, and located on either side of said wheel 2.7. When a hole moves between the Hall sensor and permanent magnet, more magnetic field lines from the magnet couples with the sensor, with an increase in its output. In this manner, wheel rotation may be monitored, with resolution dependent on the number of holes.

Construction and manufacturing tolerances can be a problem, and for Hall sensors the current (power) consumption is an inherent problem. If the wheel can be turned at 50 revolutions per second (3000 RPM), i.e. every revolution takes 20 milli-seconds (ms), and there are 200 holes (for magnetic field or light to pass through), the receiver must detect a pulse every 100 micro seconds (µs) in order to keep track of the movement, irrespective of the reporting rate required. This rather high speed sensing may result in high current consumption and the requirement for very accurate positioning of sensing system components.

As mentioned above, most computer mice today utilize some kind of rolling wheel which can be used to enter a scrolling command, whereby a cursor or other object displayed on a computer screen may be moved up or down based on the rotation of said wheel. Naturally, these computer mice comprise rotation sensing circuitry to monitor the movement of the mouse wheel. Typical mouse wheels are made out of plastic and weigh little, while their axles experience a fair amount of rotational friction. Consequently, when such a mouse wheel is rolled with a quick movement, it does not keep spinning, but rapidly comes to a stop. This makes it cumbersome to scroll a cursor over a large distance, for example through a lengthy document, as the mouse wheel has to be turned a large number of times. To overcome this, some higher end computer mice have wheel mountings with little rotational friction and a wheel having a fair amount of weight and therefore inertia. These allow users to perform a quick rolling movement to spin said wheel up, which then keeps spinning, resulting in continuous scrolling until the wheel is stopped by the user or till the wheel eventually stops by itself. However, due to the fine mechanical construction required, such a solution is not highly cost effective. The art may benefit from an invention that allows entry of a high speed, continuous scrolling command while using a low cost, low weight, high friction mouse wheel similar to what is presently employed in most mice, and which does not require the physical mouse wheel to keep spinning.

SUMMARY OF THE INVENTION

In order to overcome the shortcomings identified in the previous section a Hall sensor solution is taught which may dramatically reduce the required current consumption requirements and which may also significantly simplify construction.

A dual magnetic field sensor may be implemented using 2 sensors (e.g. Hall plates) that may conveniently be designed as part of the same integrated circuit, and wherein the Hall plates are a distance apart. Hall plates are only used as an example of magnetic sensing elements, and not as a limitation of the invention.

Using the measurements from both magnetic sensors, and where the sensors are correctly positioned relative to a rotating magnet, the orientation of said magnet in an x-y plane may be determined. Simply stated the rotation of a magnet in proximity of the magnetic sensors may be measured in absolute terms.

If a fast computer mouse (gaming) requires a reporting rate of say 1 ms, a sensor of the present invention may only need to check the position of the wheel (i.e. magnet orientation) every 1 ms. This is 10 times slower than a conventional system as described earlier. Further, a standard computer mouse may require a reporting rate of 4 ms or even 8 ms, and although this is fast in terms of human reaction time, if a sensor of the present invention is utilized, it may advantageously require sampling rates that are 40 or 80 times slower than that of the conventional system described.

The above may have direct implications on the time the Hall or magnetic sensor must be activated and hence the power consumption, as a low duty cycle proportionally reduces the power consumption of the magnetic sensor.

Furthermore, it is taught that the Hall sensor solution of the present invention may intelligently reduce sensing frequency in accordance with predetermined parameters or an algorithm when it detects no movement i.e. no rotation. If the magnetic sensor consumes a significant proportion of power when active, it is important to sensibly reduce activations thereof.

Because an absolute orientation may be measured with the sensor solution of the present invention, no information is typically lost by measuring at lower intervals (unless more than half a rotation occurs between measurements and the direction is lost, which may require additional actions to recover rotation information).

As such if no movement (i.e. rotation) is detected for a predetermined period of time, the magnetic measurement may be omitted during every second measurement period, and "no-rotation" may be reported on the standard reporting rate. The moment movement is detected the sensing rate may be stepped up again.

Of course, depending on the customer expectations in terms of reaction speed, the ratio of measurement vs no-measurement may be reduced to one in three or one in N times. The rotational measurement circuit may be instructed or controlled from a controller to reduce reporting until movement (i.e. rotation) is detected.

If the rotational wheel or object physically rotated by the user can be subjected to touch or proximity sensing, for example to capacitive touch or proximity sensing, the above-mentioned strategy may be followed when the wheel is detecting a continuous user touch.

The moment a "no-touch" condition is detected, the rotational measurements may be halted or very much reduced. The rotational measurements may still be done in a "no-touch" condition to prevent any stuck conditions, because if rotation is detected during a "no-touch" condition it may be assumed that a calibration problem is being experienced. This may be followed by a reset or re-calibration action.

Further, if a computer mouse wheel, or another rotating object, for which rotation needs to be sensed, can also be monitored with capacitive touch or proximity sensing circuitry similar to that disclosed above, a number of other advantageous embodiments of the present invention may be realized. For example, if circuitry within a computer mouse, or another object or product, can sense when a user touches the wheel of said mouse, this may be used to detect a specific type of "roll & hold" movement during which said user rotates the wheel at a first speed, said first speed falling within a predetermined first range of speeds, followed by an abrupt halt after a first amount of rotation, said first amount falling within a predetermined first range of rotational angles, where-after said user keeps his/her finger in contact with said wheel, or other object. In other words, capacitive sensing circuitry within or external to said mouse or another object may sense when a user rotates the mouse wheel and then stops the rotation while keeping their finger, as an example, pressed against the wheel. According to the present invention, detection of such a specific "roll & hold" type of movement may be used to scroll or move a displayed cursor, other icon or object at an accelerated speed or rate across, within or over an associated one-dimensional (1D), two-dimensional (2D) or three-dimensional space (3D). That is, if said mouse or other object can use capacitive, or touch and proximity sensing circuitry to verify that a user keeps holding his/her finger against the mouse wheel after rolling it for a certain amount and at a certain speed, this information may be used to quickly scroll within, for example, an associated 2D space such as a computer screen, instead of rolling the mouse wheel a number of times as is required with prior art solutions, which is cumbersome. According to the present invention, the mentioned higher speed scrolling or movement of, for example, a displayed cursor may be terminated after detection that the user has moved his/her finger away from said mouse wheel or other object, although the invention should not be limited to this. In addition, it should be understood that the invention should by no means be limited to sensing rotation with capacitive sensing circuitry only, for the embodiment just described, and others.

Preferably, Hall plate sensing or inductive sensing circuitry may be used to detect rotation speed and direction of said mouse wheel, or another object, and capacitive sensing circuitry may be used solely for detecting when the user touches said mouse-wheel or mouse-body, as required.

In a related embodiment, a user may perform a "roll & lift-off" movement, whereby the user may roll or rotate a mouse wheel, or other object, for a second amount and at a second speed, said second amount and speed respectively falling within a predetermined second range of rotational angles and second range of speeds, and then lift his/her finger from the mouse-wheel while it is being rotated. If said mouse, or other object, comprises capacitive sensing, or other touch and proximity sensing circuitry, the "lift-off" event of a user's finger while the mouse wheel is being rotated may be accurately detected. According to the present invention, detection of such a "roll & lift-off" event during rotation of a mouse-wheel or other object, wherein said event may need to satisfy a number of criteria, for example lift-off speed or period, may be used to scroll or move a displayed cursor, other icon or object at an accelerated speed or rate across, within or over an associated one-dimensional (1D), two-dimensional (2D) or three-dimensional space (3D). For example, a user may quickly scroll across an associated 2D space such as a computer screen, by rolling a mouse wheel once and then lifting his/her finger off while rolling, instead of rolling the mouse wheel a number of times as is required with prior art solutions, which is cumbersome. To terminate the higher speed scrolling thus achieved, said user may simply tap or touch said mouse wheel or the mouse again, or another method may be used. In addition, it should be understood that the invention should by no means be limited to sensing rotation with capacitive sensing circuitry only, for the embodiment just described, and others. Preferably, Hall plate sensing or inductive sensing circuitry may be used to detect rotation speed and direction of said mouse wheel, or another object, and capacitive sensing circuitry may be used solely for detecting when the user touches said mouse-wheel or mouse-body and said lift-off event, as required.

It is to be appreciated that the preceding "roll & hold" and "roll & lift-off" embodiments allow a mouse wheel to keep spinning virtually in associated software, even after the physical wheel has stopped to rotate or slowed significantly. In other words, according to the present invention, there need not be a one-to-one relation between the movement of a physical mouse wheel and that of a virtual mouse wheel in software or a cursor or icon. This may facilitate the use of a low cost, low weight mouse wheel out of plastic, as an exemplary material, with fairly high rotational friction to emulate the functionality of higher end computer mice, as described during the Background section. According to the present invention, a user may perform the one or other action on a physical mouse wheel which may cause a virtual mouse wheel to spin at a certain speed, and to keep spinning until another specific action is performed by said user on the physical wheel or mouse. As long as the virtual mouse wheel spins, scrolling within an associated 1D, 2D or 3D displayed space may continue. Therefore, the present invention may even offer an advantage over said higher end computer mice, as the low-friction wheels of those will eventually stop, whereas said virtual mouse wheel can spin indefinitely, once it is started, should it be required. The present invention also teaches that a predetermined amount of damping may be applied to the spinning of said virtual wheel to ensure it stops eventually, should this be needed. A user may also be provided with the opportunity to adjust or select the amount of damping applied to the spinning of said virtual wheel.

Further, according to the present invention, once said virtual mouse wheel is spinning, for example due to the described "roll & hold" or "roll & lift-off" events, the spinning speed (and therefore the scrolling speed within the associated displayed space) may be increased or decreased in response to specific further user actions performed on said physical mouse wheel or on dedicated touch electrodes. For example, if a "roll & lift-off" movement, during which the physical mouse wheel was rolled backwards, was used to start the spin of said virtual mouse-wheel, a subsequent forward rolling movement or movements may be used to decrease the spin rate of the virtual wheel, and therefore also the scrolling rate. Or an additional subsequent backward rolling movement or movements may be used to increase the spin rate of said virtual wheel, and thus the scrolling speed. Naturally, if the physical mouse wheel was rolled forward during said "roll & lift-off" wheel, the inverse applies, whereby the virtual wheel spinning speed may be decreased with a subsequent backward rolling movement or movements, and increased with additional further forward rolling movement or movements.

In another embodiment, the spinning speed of said virtual mouse wheel (and therefore the scrolling speed) may be adjusted based on measurement or detection of subsequent dedicated touches to the physical mouse wheel. For example, if a "roll & lift-off" movement with a backwards roll was performed on the physical mouse wheel to start the virtual spin, a user may subsequently touch said physical wheel towards the front of the mouse to decrease the virtual mouse wheel spinning speed, whereas a subsequent touch towards the back of the mouse on said physical wheel may increase the virtual mouse wheel spinning speed. As before, the inverse also applies, where an initial forward rolling movement results in a virtual spin (and therefore scrolling) which may be slowed with subsequent touches on the physical wheel towards the back of the mouse, and which may be accelerated with touches on the physical wheel towards the front of the mouse. It stands to reason that in the preceding, said subsequent touches need not be limited to the surface of the physical mouse wheel, but may also be performed and measured for dedicated touch electrodes on or beneath other parts of the mouse body, for example directly in front and directly behind the slot of the wheel.

It is a specific advantage if the measurement circuitry used for the magnetic field sensing and the touch sensing operations is shared. Specifically, the charge transfer measurement system and circuitry with selectable current mirrors and/or parasitic removal implementations as taught in U.S. Pat. No. 8,395,395, U.S. Pat. No. 8,659,306 and in U.S. Pat. No. 9,360,510, granted to Bruwer et al, are of interest. If a charge transfer measurement system as taught by these patents is used to measure the signals from magnetic field sensors, it may be possible to utilize said selectable current mirrors and parasitic removal implementations to balance said signals. For example, the signals may be generated by Hall plates. In an exemplary embodiment, the maximum and minimum signal values from two Hall plates during one revolution of an associated wheel may be compared. Said selectable current mirrors and parasitic removal implementations may then be used to balance said signals, ensuring that the same signal deviation over a revolution is obtained. Such signal balancing may also be used to compensate for drift due to mechanical component aging, or other causes. Naturally, the use of these techniques is not limited to the example of two Hall plates, but may be used to balance the signals from any number of Hall plates, or compensate for deviations due to manufacturing, usage etc.

An integrated circuit performing the measurements based on the above disclosed sensor solution may be equipped to calculate the rotation or merely check for changes and report the measurements to a controller that can calculate the rotation. Either way it is important to recognize that the predominant event will typically be no-rotation, and hence the interface must be designed to minimize the "effort or time" to report this.

Also note that according to the present invention the two magnetic sensors need not be on the same silicon die. Separate Hall plate or magnetic sensor chips may be used as this will help increase the physical separation between the two magnetic sensors. The separate sensor or Hall plate chips may be bonded (dual die) inside the same package (e.g. MSOP10) or may be connected externally. The separation has an effect on the resolution of the rotation that may be detected.

If the two magnetic field sense plates are measured sequentially, it is clear that due to the movement or rotation the sequential measurements will differ from measurements done simultaneously. This deviation between sequential measurements may be corrected during or after calculation of direction and amount of movement or rotation.

In another embodiment, an integrated circuit or another system which practices the teachings of the present invention may be used to monitor the magnetic field orientation and strength in an open/close sensor, e.g. an alarm system open/close sensor. For example, if said integrated circuit is situated on a static window or door frame, it may measure the absolute orientation angle of a diametrically polarised magnet located on the associated window or door, as well as the field strength of said magnet. Such an arrangement may increase the difficulty to tamper or bypass said open/close sensor through the application of an additional or illegitimate magnet which are located external to said window or door. The open/close sensor of the present invention may require that any window or door, or another object, opening-event be characterised by a magnetic field of a specific absolute orientation angle which decreases at a predetermined or known rate as the window or door opens. Therefore, an intruder who wishes to bypass the open/close sensor needs to apply said additional or illegitimate magnet to exactly match the orientation of the magnet of the open/close sensor.

In a related embodiment, an integrated circuit or another system which practises the teachings of the present invention may be used with a diametrically polarised magnet to monitor the open/closed status of a lock, for example the lock of an electric utility meter's cover. Said integrated circuit or system may be used to measure the absolute orientation angle of said magnet, and thereby of said lock. A monitoring circuit, which may be located within said integrated circuit or elsewhere, may require that a cover open detect event be preceded by a predetermined change in the absolute orientation angle measured for said magnet. Said cover open event may be characterised by a specific decrease in the magnetic field strength measured for said magnet as the cover is opened. In other words, when the cover of said utility meter, or another product, is forced open by breaking the lock without turning it through the required amount, said monitoring system may declare a tamper event, since the decrease in magnetic field strength measured as the cover is opened was not preceded by said predetermined measured change in magnet orientation. Naturally, the above need not only be limited to electric utility meters, but may find advantageous use in a large number of applications, for example door locks.

In yet another exemplary embodiment of the present invention, a knob for a user-interface (UI) may be realized which may use a single integrated circuit to sense absolute or relative rotation of said knob, as well as absolute or relative movement of the knob in a direction orthogonal to the plane of rotation. In addition, said knob may be located external to a liquid- or gas-proof enclosure, with circuitry required to detect knob motion located internal to the enclosure. For example, according to the present invention, a UI knob may be realized which may be turned forwards or backwards to facilitate changing the one or other parameter controlled by said UI, for example a light level, but wherein said knob may then also be pressed to indicate a selection, for example to indicate selection of the present light level. Without placing undue limits, the rotation of said knob may be detected by placing a diametrically polarized magnet on the axle of rotation, or elsewhere, and using a magnetically sensitive member within said integrated circuit, for example a Hall-effect sensor, an AMR sensor, a GMR sensor, or another magnetic sensor as known in the art, to discern rotation of said magnet, and thereby of said knob. Further, the same integrated circuit may be used to detect knob motion in a direction orthogonal to the plane of rotation, i.e. when the knob is pressed, whereby said circuit may be connected to an inductor, or may comprise an inductive structure, and wherein an metal member, for example an aluminium member, is brought closer/further to said inductor when said knob is pressed/released, which may cause an increase/decrease in eddy-current losses due to said metal member, in turn causing a measurable change in inductance, which may be detected by said circuit. The integrated circuit may utilize the same charge transfer circuitry to measure both the magnetic fields with said magnetically sensitive member and the inductance of said inductor or inductive structure, as an example. Or the integrated circuit may utilize distinct circuits, which may be charge transfer circuits, to measure said magnetic fields and said inductance. Naturally, the invention need not be limited to single integrated circuit embodiments, but may also be embodied by multiple circuits, which may or may not be integrated.

In the preceding, measurement of the movement of said knob in a direction orthogonal to the plane of rotation, i.e. movement of the knob when pressed/released, need not only be performed with inductance measurements. For example, according to the present invention, knob movement when pressed/released may also be detected or monitored with capacitive measurements, using, for example, charge transfer circuitry. The present invention also need not be limited only to applications with a sealed enclosure, where said knob is located externally to said enclosure, but may also be used in applications that do not require a sealed enclosure.

A specific, advantageous UI may be realized with a knob as described in the preceding disclosure. For example, according to the invention, the UI may allow a user, from a power-off state or low-power state, to press said knob a first time, which may activate the UI. This may for example be indicated to the user with an LED or the one or other visual, audible or haptic indicator. Subsequently, the user may rotate said knob, with said rotation angle measured and stored by said integrated circuit. The UI may indicate the amount of rotation to the user with indicators, such as a circular array of LED's around the knob, a bar of LED's, an audible indicator, a haptic indicator and so forth. To execute a turn-off event, said user may subsequently press the knob again, that is, a second time, which may cause the UI to deactivate, and/or cause a load or device controlled by said UI to switch off. Therefore, according to the present invention, the user need not turn said knob back to the starting point of rotation to cause a turn-off event. However, turning the knob back to the starting point of rotation to cause turn-off should not be excluded from the present invention. Further, according to a first exemplary UI embodiment, when the user presses said knob again, that is, a third time, the UI may reactivate and immediately return to said angle of rotation stored before turn-off, and indicate this to said user. In a second exemplary UI embodiment, the UI may return to a zero or minimum angle of rotation upon reactivation, in other words to the original starting point of rotation or a minimum level, when the user presses said knob again for a third time.

To clarify the above, two non-limiting applications of the knob based UI may be presented. For example, consider the case where said first UI embodiment is used to control the level of a lighting load, i.e. a dimming application. When the light is off, a user may press the knob once to turn said UI and the light on. As the user subsequently turns the knob, the UI may control said light to continually become brighter, and provide knob rotation indication to the user. The amount of knob rotation may be stored. When the user presses the knob again, that is, a second time, the UI may interpret this as a turn-off command, and turn the light off. Subsequently, if the user presses said knob again, for a third time, the UI may turn-on, and may immediately return knob rotation indicator to the previously stored angle of knob rotation and the light to the light level before turn-off. The user may then resume light control by turning the knob forwards or backwards, as desired.

Next, consider the case where said second UI embodiment is used to control the heat of a stove plate. When the stove is off, the user may press the knob once, or a number of times, or in a time-based pattern, during a first knob-press event. This may cause said UI and stove plate to turn on, which may be indicated. Next, the user may turn the knob, with the angle of rotation sensed, stored and indicated by the UI. The power consumption and subsequent heat level of the stove plate may be increased as said angle of rotation increases. The selected point of rotation and stove plate heat point may be indicated to the user, using any of the indicators previously listed. Accordingly, when the user wishes to turn said stove plate off, he/she may press the knob again, that is for a second time, or in a predetermined time-based pattern. The UI may indicate the switch-off state to said user, for example by switching off all LED's in a circular pattern, and may control said stove plate to switch off. According to said second embodiment, when the user presses said knob again, i.e. for a third time, the UI may reactivate and provide an indicator, but revert to a zero degrees angle of rotation, i.e. the stove-plate being off or at a minimum heat level, and indicate this to the user. The user may then be required to turn said knob to a desired position again, before heat of said plate is adjusted. In other words, in the second UI embodiment, the stove plate restarts from a zero or minimum level, whereas in the first UI embodiment, the light returns to the previously stored level. Both UI embodiments may be realized with the same UI knob and circuitry as disclosed.

In a third UI embodiment, the UI may reactivate after said third press on the knob and immediately set the rotational position for said knob to a predetermined value, and provide a corresponding indication. In other words, when the UI, and possibly a load controlled by said UI, is reactivated after said third press, the rotational position for said knob may be set to a pre-set value.

In an embodiment related to the above, from a low-power or deactivated state, a user may first turn said knob, with the amount of rotation used to measure, select and indicate a desired power level, followed by a press event to activate a load controlled by the UI at the level selected. In other words, the user may first select the level desired, and then activate said load at the specific level.

It is to be appreciated that the present invention should not just be limited to control of electrical loads such as lights or heating elements with the disclosed knob and UI. For example, a UI, knob and circuitry as described may advantageously be used to control the frequency selection on a radio or for volume control on an audio device, or for the one or another functionality of an electronic device, or for the configuration or setup of an electronic device.

BRIEF DESCRIPTION OF THE DRAWINGS

The invention is further described by way of examples with reference to the accompanying drawings in which.

DESCRIPTION OF PREFERRED EMBODIMENTS

Figure 3:
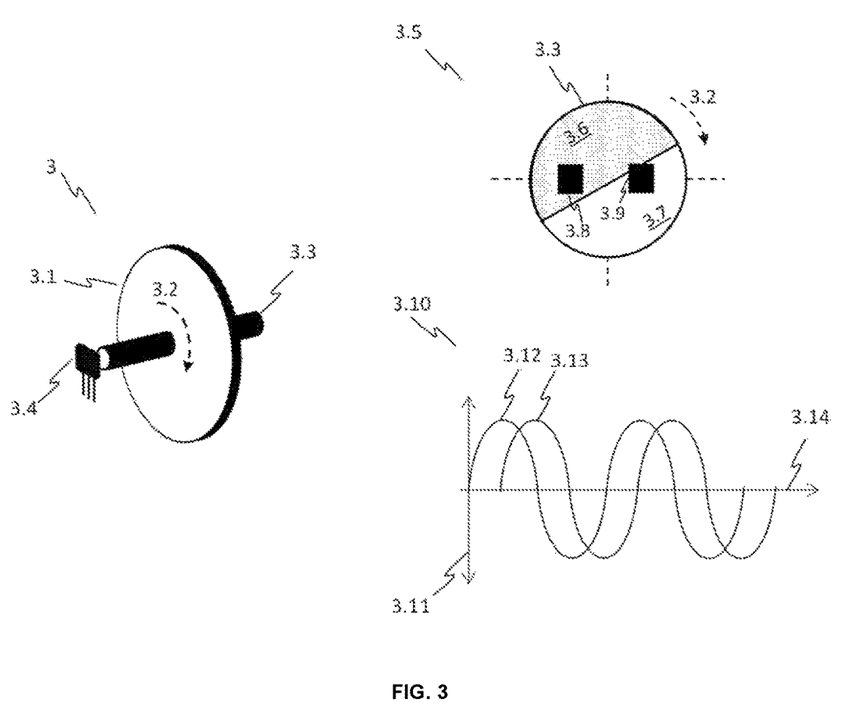
FIG. 3 shows an exemplary embodiment of the present invention, where dual magnetic sensors are used to determine absolute rotation orientation.

FIG. 3 presents an exemplary embodiment of the present invention. At (3), a wheel (3.1) which rotates in a direction (3.2) around an axle (3.3) is shown. A magnetic sensor, for example a Hall sensor, (3.4) is positioned at the end of axle (3.3). A magnet may be attached to or embedded in axle (3.3), or the axle may comprise magnetic material, in a manner which results in opposite magnetic poles being formed in or close to the two halves of said axle, in a lengthwise sense. This is illustrated at (3.5), which presents an end view of axle (3.3) down its length. A north magnetic pole (3.6) and a south pole (3.7) exist in the two halves of the axle. For example, the axle itself may be a magnet, or magnets may be attached to the periphery of an axle formed out of magnetically permeable material. If magnetic sensor (3.4) contains two Hall plates (3.8) and (3.9), for example, wherein said plates are separated by a specific distance, waveforms (3.12) and (3.12) as illustrated at (3.10) should typically result, where axis (3.11) represents amplitude and axis (3.14) time. As shown, dependent on the distance separating said sensors, some phase shift will exist between the two resultant waveforms. According to the present invention, the absolute rotation angle of wheel (3.1) may be calculated from the resultant waveforms. From this angle, and the measurement of time, the amount of rotation and speed of rotation may be determined. If the wheel rotates less than a predetermined minimum within a specific period, the frequency for measurements with magnetic sensors (3.8) and (3.9) may be reduced, in order to conserve power, as taught during the Summary of this disclosure.

Figure 4:
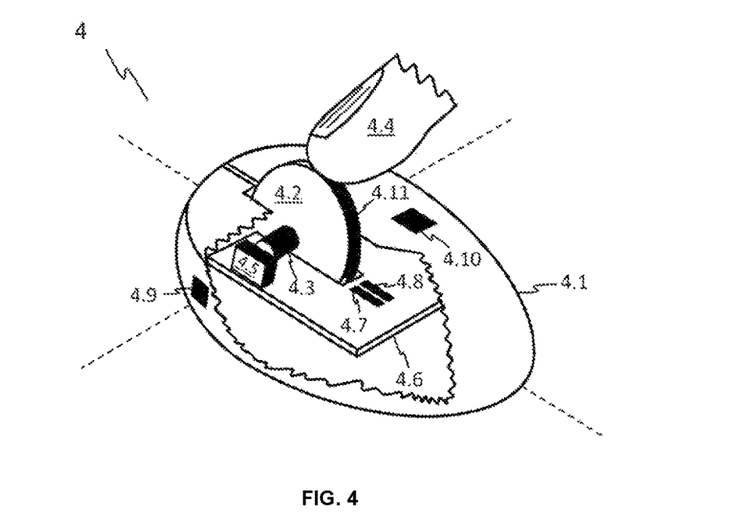
FIG. 4 shows an exemplary embodiment of the present invention, where an integrated circuit may be used to monitor magnetic sensors and capacitive touch sensors.

Another exemplary embodiment of the present invention is shown in FIG. 4. A cut-away view of a computer mouse (4.1) is presented at (4). Said mouse uses a mouse wheel (4.2) as a user interface device, as is known in the art. A user's finger (4.4) may rotate wheel (4.2) to scroll within an associated displayed space. According the present invention, axle (4.3) may comprise a magnet or magnetic material which results in two magnetic poles being formed in each lengthwise halve of the axle, similar to that presented in FIG. 3. Axle (4.3) rotates with said wheel, resulting in a varying magnetic field sweeping past integrated circuit (4.5) which implements the teachings of the present invention, and which has been placed in proximity to the end of axle (4.3). Integrated circuit (4.5) may contain one or more Hall sensor plates, for example two, spaced a distance apart and used to determine the absolute rotation angle of wheel (4.2), as taught during the preceding disclosure. When rotation is less than a predetermined minimum for more than a predetermined period, the frequency of measurements with the two Hall plates may be reduced to conserve power. Due to the fact that an absolute rotation angle for wheel (4.2) is measured, no information should be lost if the frequency of measurements is reduced. If more than half a rotation is missed, rotational information may be recuperated dependent on the correct measurement of subsequent rotations, and whether the assumption that rotation of said wheel will not stop abruptly is justified.

In addition, to further reduce power consumption when the rotation of wheel (4.2) is less than a predetermined minimum for more than a predetermined period, the present invention teaches that sensing whether a user is in proximity to or touches the device which houses the rotating wheel, in this case mouse (4.1), may be used. Such proximity or touch sensing may be based on capacitance measurements, as is well known in the art. In the example shown, integrated circuit (4.5) may perform such capacitance measurements, in addition to magnetic field sensing as disclosed earlier. Touch sensing to determine whether a user engages mouse (4.1) may be performed using any of a number of electrode structures. For example, an electrode (4.11) may be attached to an outer edge of wheel (4.2). When a user's finger (4.4) touches the wheel and electrode (4.11), this may influence the coupling between a projected capacitance electrode pair (4.7) and (4.8) discernibly. Or capacitive sensing electrodes may be attached, or located close to the body of mouse (4.1), as illustrated in exemplary manner at (4.9) and (4.10). These electrodes should experience a change in coupling when a user grips the mouse. As taught earlier, when integrated circuit (4.5) detects a "no-touch" condition for longer than a specific period, it may cease to measure with its magnetic sensors altogether, and only utilize touch sensing. Once a valid touch is detected again, the magnetic sensors contained or controlled by the integrated circuit may be activated again.

In the preceding, the focus has been on sensing of rotational movement, for example of a mouse wheel. However, the present invention should not be constrained to this. Two dimensional (2D) movement, or three dimensional (3D) movement, may be detected with magnetic sensors, for example Hall-effect sensors, used with magnets or magnetic material located correctly relative to said sensors. The present invention teaches that during detection or measurement of movement of the one or other object in 2D or 3D, the frequency of magnetic sensor measurements may be adjusted according to the amount of movement detected or measured, to conserve power. In addition, this may be augmented by proximity or touch sensing, for example capacitive touch sensing, which is used to decide when to completely deactivate magnetic sensor based measurements due to, for example, a "no-touch" condition.

Figure 5:
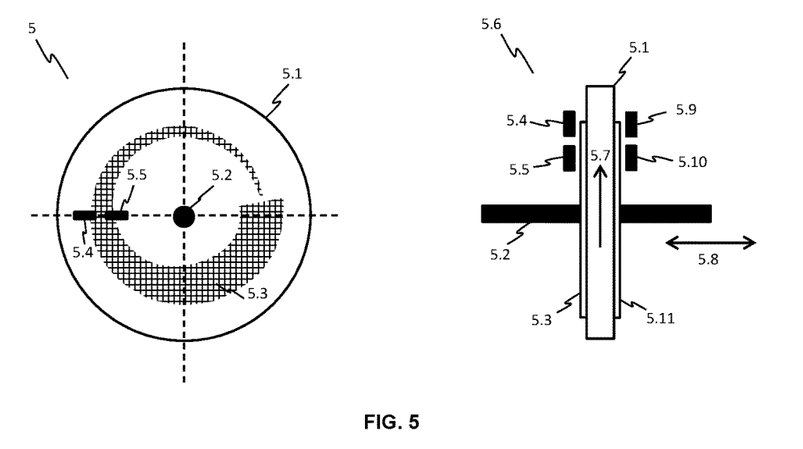
FIG. 5 shows an exemplary embodiment of the present invention, where capacitive sensing is used to determine absolute rotation orientation.

The present invention also teaches that absolute rotation angle may be determined from capacitive measurements only. FIG. 5 shows an exemplary embodiment. At (5) a side view of a wheel (5.1) that rotates about an axle (5.2) is shown. A concentric conductive strip (5.3), with a continually varying width is located on a face of wheel (5.1). A projected capacitance measurement electrode pair, (5.4) and (5.5), as is known in the art of capacitance measurement, is located adjacent to said wheel, in close proximity to said strip. Strip (5.3) may be floating, grounded or capacitively coupled to the one or other potential. When wheel (5.1) rotates, strip (5.3) should continually influence the coupling between projected electrodes (5.4) and (5.5), dependent on the angle of rotation. This may allow an associated capacitive measurement circuit, or another circuit, to calculate the absolute angle of rotation. At a specific angle, strip width decreases or increases significantly in a stepped manner, as it goes from its widest to most narrow section, dependent on rotation direction. The effect of this on said coupling may be used as a discernible event.

In practice, a mouse scrolling wheel may move slightly from side to side as it is turned, due to required low cost construction techniques. Such movement may reduce the accuracy with which capacitive measurements may be used to determine absolute angle of rotation in the manner illustrated at (5), and described above. The present invention teaches that this drawback may be overcome by placing a second projected capacitance measurement electrode pair on the opposite side of the rotating wheel, aligned with a first projected pair. Such an embodiment is illustrated in exemplary manner at (5.6), showing a top view. When wheel (5.1) is rotated in direction (5.7) by a user, it may move slightly from side to side in direction (5.8). To negate the effect of this on the coupling of strip (5.3) with projected pair (5.4) and (5.5), the present invention teaches that a second strip (5.11), closely matching and aligned with strip (5.3) may be located on the opposite side of wheel (5.1), along with a second projected pair (5.9) and (5.10). If coupling between strip (5.3) and projected pair (5.4) and (5.5) is reduced due to movement of the wheel in direction (5.8), coupling between strip (5.11) and projected pair (5.9) and (5.10) should increase accordingly, and vice versa. By taking the average of the change in capacitance for the two pairs of projected electrodes, the effect of sideways movement in direction (5.8) by wheel (5.1) should be negated.

The present invention is not limited to the example presented in FIG. 5 for the determination of the absolute angle of rotation using capacitive measurements, with a large number of electrode and conductive strip combinations pertaining. What is paramount is that the rotation of a wheel causes a continual increase or decrease in capacitance measured, and this is used to determine said angle. For example, a self-capacitance measurement may be used, along with a strip on the outer edge of the wheel, where the strip width varies continually until a step in width is reached. As a user touches the wheel, and rotates it, the coupling between a self-capacitance electrode and ground will continually vary in an increasing or decreasing manner, from which the angle of rotation may be deduced. Or the example of FIG. 5 may be adjusted by using a single conductive strip which is integrated into the wheel, and equally spaced from the two projected pairs if the wheel is centred in the sense of direction (5.8). Or the wheel may be made of a dielectric material with good capacitive coupling properties (i.e. a good relative permittivity), and the concentric strip may be replaced with a concentric gap in the wheel, where more or less dielectric material is in close proximity to a specific projected pair as the wheel is rotated. It would be obvious to one skilled in the art of capacitive sensing that a large number of implementations are possible which embody the present invention.

In another embodiment, the speed with which a user rotates a mouse wheel may be used to determine whether capacitive or magnetic sensing should be used. If a user turns the wheel at more than a predetermined speed, the circuitry used for monitoring said wheel movement may completely deactivate magnetic sensing of absolute rotation angle, to conserve power, and only use capacitive sensing of rotation. The latter may then be used to monitor the rotation speed of the wheel to ensure it stays above said predetermined minimum. Accordingly, scrolling within an associated displayed space is performed at a maximum rate, for example. Once rotation speed falls below said predetermined value, magnetic sensing may be used to sense absolute rotation angle with high accuracy.

Figure 6:
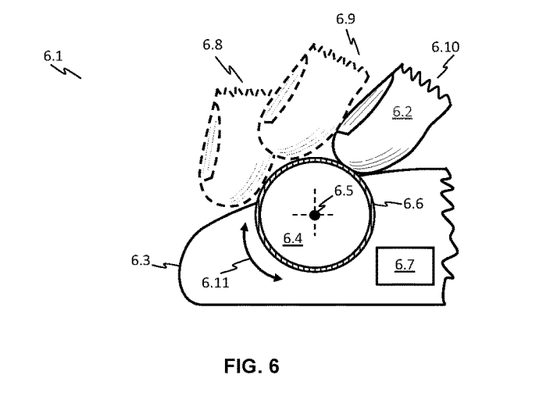
FIG. 6 shows an exemplary mouse wheel embodiment, where a "roll & hold" movement may be used to start spinning of a virtual mouse wheel and associated high speed scrolling.

FIG. 6 shows a sectional side-view of an exemplary mouse wheel embodiment of the present invention at 6.1, wherein a user's finger 6.2 rotates a wheel 6.4 of a computer mouse 6.3 in a direction 6.11 about an axis 6.5. Direction 6.11 may be either backwards of forwards. Further, mouse 6.3 may measure rotation of said wheel 6.4 and detect when user's finger 6.2 is in proximity to or touches the wheel by using circuitry 6.7, wherein the latter may also comprise capacitive sensing circuitry as is known in the art. Preferably, circuitry 6.7 includes Hall effect sensing circuitry or inductive sensing circuitry for the measurement of wheel 6.4's rotation speed and direction. Further, a strip of metal or other conductive material 6.6 may be attached to a part of wheel 6.4 or to its complete circumference as shown, with said strip which may be used during said proximity and/or touch detection, similar to that described for FIG. 4. In the embodiment shown, user finger 6.2 rotates wheel 6.4 backwards for a first amount by moving from position 6.8 via position 6.9 to position 6.10, where-after the user may hold his/her finger against the wheel for a first period at position 6.10. It is to be appreciated that said wheel may also be rolled forwards, from position 6.10 to 6.8 via position 6.9. According to the present invention, proximity and touch detection circuitry within member 6.7, for example capacitive proximity and touch detection circuitry, may be used to verify that user finger 6.2 stays in contact with wheel 6.4 during the complete duration of first amount of rotation preceding arrival at position 6.10. Once such verification has been obtained, a displayed cursor, icon or another object within an associated 1D, 2D or 3D space, for example a computer screen, may be moved or scrolled at an increased speed or rate for the duration of said first period. Said speed or rate of scrolling is therefore not dependent on the continuous rotation of physical mouse wheel 6.4. Once user finger 6.2 moves away from wheel 6.4 at position 6.10, said movement or scrolling of the cursor, icon or other object may be terminated.

Figure 7:
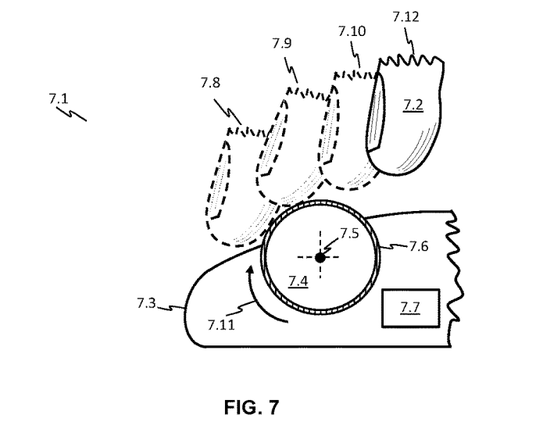
FIG. 7 shows an exemplary mouse wheel embodiment, where a "roll & lift-off" movement may be used to start spinning of a virtual mouse wheel and associated high speed scrolling.

An associated embodiment is illustrated with a sectional side-view in FIG. 7, with most of the reference numerals corresponding, and therefore not elaborated on except where required. In the embodiment, user finger 7.2 may also rotate mouse wheel 7.4 in direction 7.11 from position 7.8 through position 7.9 at a predetermined speed. (Direction 7.11 may also be from back to front, that is from 7.9 to 7.8, and the invention should not be limited in this) However, unlike the embodiment depicted in FIG. 6, user finger 7.2 lifts off from wheel 7.4 while rotating it, as illustrated at positions 7.10 and 7.12. Accordingly, proximity and touch sensing circuitry, for example capacitive proximity and touch sensing circuitry, in member 7.7 may detect that user finger 7.2 touches wheel 7.4 continuously during rotation, and then lifts-off from it, wherein annunciation of said lift-off event may be dependent on a number of required criteria. Once such a rotation at a speed equal to or more than a predetermined speed and a lift-off event has been detected, a displayed cursor, icon or another object within an associated 1D, 2D or 3D space, for example a cursor on computer screen, may be moved at an increased speed or rate until a user touches or taps said wheel again.

Figure 8:
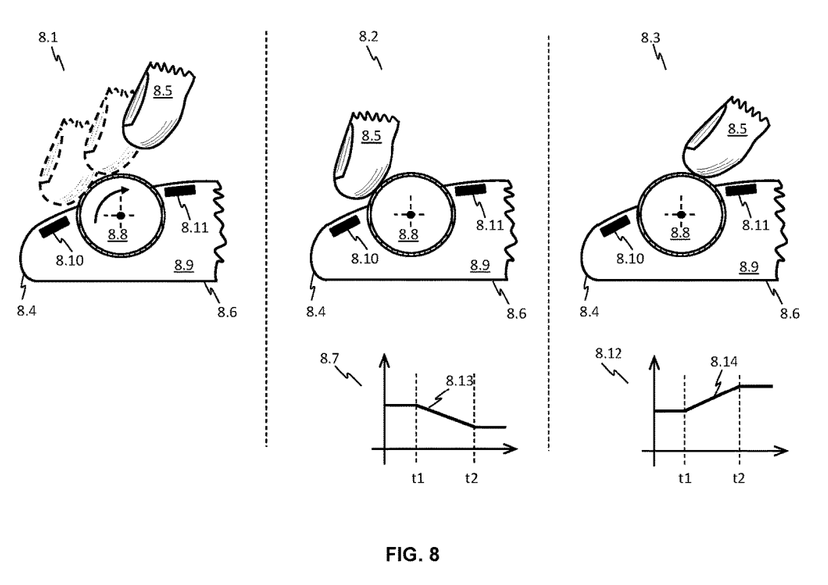
FIG. 8 shows an exemplary mouse wheel embodiment, wherein touches to the mouse wheel after a "roll & lift-off" movement may be used to either increase or decrease the spinning speed of an associated virtual mouse wheel and scrolling within a displayed space.

In FIG. 8, an exemplary embodiment of the present invention is shown which may allow a "roll & lift-off" movement and subsequent touches to be used for scrolling at an adjustable higher speed, without the requirement that the physical mouse wheel should keep spinning for the duration of the scrolling. At 8.1 a user's finger 8.5 performs a "roll & lift-off" action on physical mouse wheel 8.8, wherein said action may be detected with, amongst others, capacitive sensing, Hall sensing and inductive sensing circuitry (not shown), as described earlier. Once such a "roll & lift-off" movement has been performed, detected and verified, a cursor, icon or other object within an associated 1D, 2D or 3D displayed space (not shown), may be scrolled or moved at a first speed which may be higher than the speed with which wheel 8.8 was rotated during said "roll & lift-off" movement, and wherein the scrolling or movement of said cursor, icon or other object does not require that wheel 8.8 keeps spinning. In other words, the "roll & lift-off" action of 8.1 causes a virtual mouse-wheel to start spinning in software executing within the mouse, or on an associated computer, wherein the spinning may continue after wheel 8.8 has stopped rotating, and wherein scrolling speed is directly related to the spinning speed of the virtual wheel. According to the present invention, should a user wish to adjust the spinning speed of the virtual mouse wheel, and therefore the scrolling speed, after performing a "roll & lift-off" action, they may touch the physical wheel 8.8 towards the front 8.4 of mouse 8.9, as depicted at 8.2, or towards the rear 8.6 of mouse 8.9, as depicted at 8.3. For example, if said "roll & lift-off" movement was performed with a backwards roll, as shown at 8.1, the spinning speed of the virtual wheel, and the associated scrolling speed, may be decreased by touching mouse wheel 8.8 towards the front 8.4 of mouse 8.9, as shown at 8.2. The resulting decrease in scrolling speed is depicted qualitatively at 8.7 with graph 8.13, wherein the user touches wheel 8.8 towards the front at time t1 and removes the touch at t2. Conversely, if a user wants increase the virtual wheel spinning speed, and the associated scrolling speed, after an initial backwards "roll & lift-off" movement, they may touch wheel 8.8 towards the back 8.6 of mouse 8.9, as shown at 8.3 in a sectional side-view. Graph 8.14, depicted in a qualitative manner at 8.12, presents the resulting increase in scrolling speed if a user touches wheel 8.8 towards the rear from time t1 to time t2. Naturally, the invention is not limited to a single touch event after, for example, a "roll & lift-off" action to decrease/increase the spinning speed of the virtual wheel and the associated scrolling speed, but multiple, sequential touches may be used, for example, wherein each touch further decreases/increases the scrolling speed. Further, a forwards "roll & lift-off" action may also be used in the above, wherein a subsequent additional touch on wheel 8.8 towards the rear of the mouse may then be used to decrease the scrolling speed and a touch on said wheel towards the front may be used to increase scrolling speed. In addition, the present invention teaches that touches subsequent to a "roll & lift-off" action need not be limited to the mouse wheel 8.8 only, but may also be made on, and detected for, other parts of the body of mouse 8.9. For example, touch electrodes 8.10 and 8.11 may be used for said subsequent touches. Lastly, the present invention should not be limited to only the use of a "roll & lift-off" action with subsequent additional touches to adjust the spinning speed of said virtual mouse wheel, and the associated scrolling speed. For example, a user may perform a "roll & hold" action with one finger, and make subsequent touches, or press a button, with another finger to decrease or increase said scrolling speed.

Figure 9:
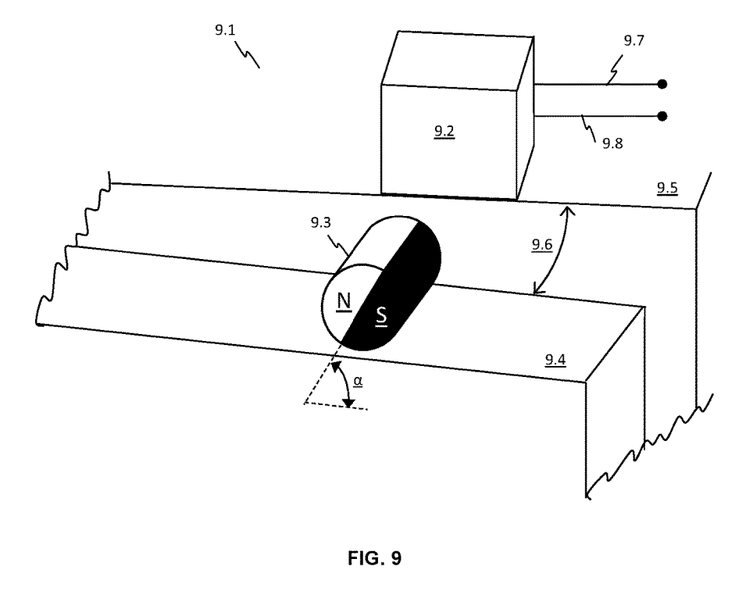
FIG. 9 shows an exemplary open/close sensor embodiment, wherein the absolute orientation angle of a diametrically polarised magnet is monitored.

In FIG. 9, an open/close sensor which embodies the teachings of the present invention in an exemplary manner is shown at 9.1. An integrated circuit 9.2 is located on a door frame 9.5, with said frame typically being stationary. The integrated circuit 9.2 is associated with a diametrically polarised magnet 9.3, wherein said magnet 9.3 is placed on a door 9.4 such that its absolute angle of orientation is a, as depicted. Said door swings on hinges (not shown) towards and from door frame 9.5 along direction 9.6. The integrated circuit may be powered via interconnects 9.7 and 9.8, and may also use these connections for communication, as is known in the art. According to the present invention, the open/close sensor at 9.1 may require that the angle of orientation measured for magnet 9.3 by integrated circuit 9.2 stay constant at a, or changes from a at a known rate, for example when door 9.4 is opened. Should said angle or orientation deviate from that expected, the open/close sensor of the present invention may raise an alarm or communicate data to another circuit which may lead to an alarm which is raised. This may make it exceedingly difficult to tamper or bypass an open/close sensor as depicted in FIG. 9, as the would-be intruder may need to match the angle of orientation of magnet 9.3 exactly with the tampering or illegitimate magnet. Naturally, the invention is not limited to door open/close sensors, but may find advantageous use in other open/close sensors, such as window open/close sensors and so forth.

Figure 10:
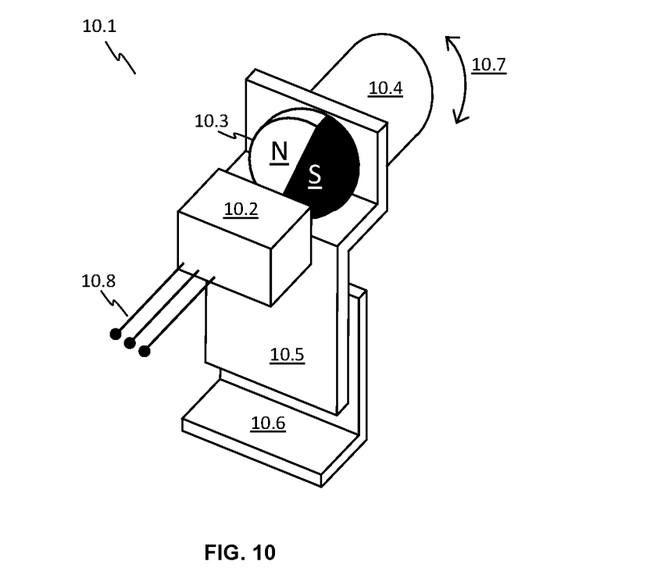
FIG. 10 shows an exemplary lock monitor embodiment, wherein the absolute orientation of the lock is monitored, with the lock in the closed position.
Figure 11:
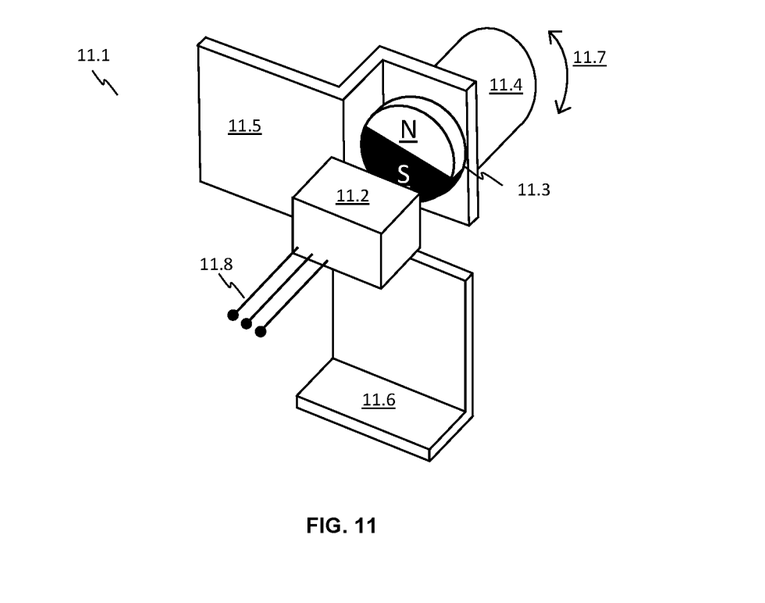
FIG. 11 shows the embodiment of FIG. 10 with the lock in the open position.

An exemplary embodiment related to FIG. 9 is shown in FIG. 10 and FIG. 11 at 10.1 and 11.1 respectively. In these instances, the present invention is used to facilitate a lock orientation monitoring system, for example with the lock of an electric utility meter. At 10.1 an integrated circuit 10.2 which embodies the present invention is shown, wherein said integrated circuit may measure the absolute orientation angle of an associated, diametrically polarized magnet 10.3. The magnet 10.3 may be mechanically fixed to lock 10.4 via latching plate 10.5, which is in turn fixed to the door or cover of the electric utility meter (not shown). A catch 10.6 may be fixed to the meter's body (not shown), with integrated circuit 10.2 also fixed to said body. When lock 10.4 is locked/unlocked, it may turn in direction 10.7, with the associated proportional turning of magnet 10.3. (In the example depicted, proportionality is fixed at unity, as is evident). The open state of said lock is depicted at 11.1 in FIG. 11, with like numerals referring to like members, apart from the prefix 10 or 11. As is evident, once the lock has swung to the position shown in FIG. 11, the door/cover (not shown) to which lock 10.4 is fixed may be opened without latch plate 11.5 catching on plate 11.6. It is also evident that the orientation angle of magnet 10.3 differs significantly between the closed/locked state of FIG. 10 and the open/unlocked state of FIG. 11. According to the present invention, integrated circuit 10.2/11.2 may require a predetermined change in the orientation angle measured for magnet 10.3/11.3 to precede a reduction in the magnetic field strength measured for said magnet, wherein said reduction implies that the door or cover of said meter has been opened. If the predetermined change in measured orientation angle does not precede said reduction, a tamper event may be declared, with integrated circuit 10.2/11.2 which may subsequently activate an alarm, or which may communicate relevant data via interconnections 10.8/11.8 that may lead to the activation of an alarm or alarm condition. It is to be appreciated that the present invention is not limited to the monitoring of electric utility meter cover or door locks, but that it may be advantageously applied to numerous other products as well.

Figure 12:
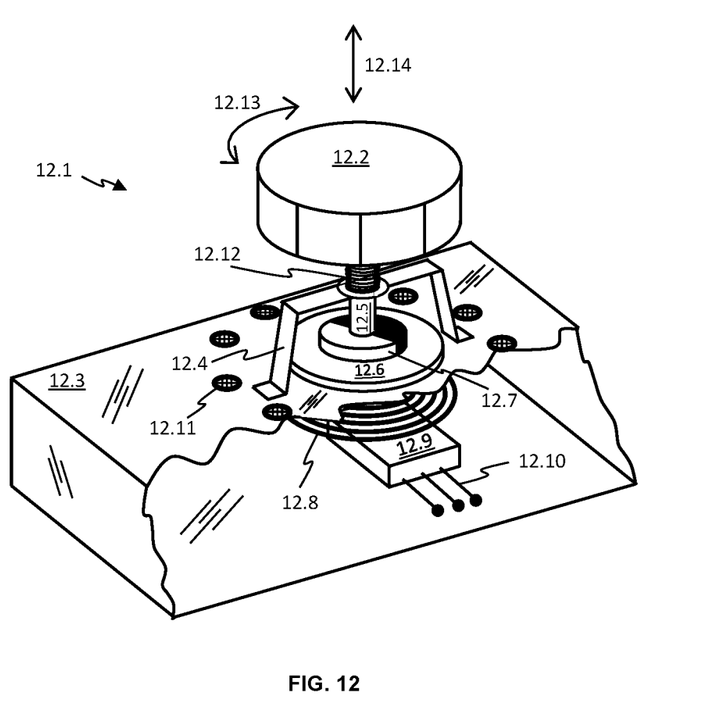
FIG. 12 shows an exemplary embodiment in the form of a user interface knob.
Figure 13:
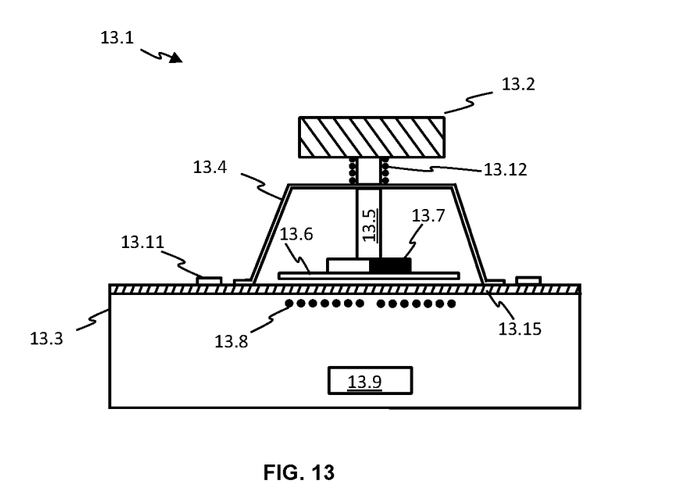
FIG. 13 shows a cross-sectional view of the user interface knob embodiment of FIG. 12

A user-interface (UI) knob which may be used with a liquid- or gas-proof enclosure, and which embodies the teachings of the present invention, is presented in exemplary manner at 12.1 in FIG. 12, with a cross-sectional view at 13.1 in FIG. 13. Apart from the prescript 12 or 13, reference numerals in FIG. 12 and FIG. 13 refer to the same members. Accordingly, the description hereafter mainly refers to FIG. 12, but with the understanding that the corresponding member in FIG. 13 is implicitly also being referred to. Knob 12.2 is situated external to enclosure 12.3, with the latter which may be, but need not be, impervious to liquids or gasses, i.e. sealed. As indicated by arrows 12.13 and 12.14, knob 12.2 may be rotated in direction 12.13, but may also be moved (pressed/released) in a direction orthogonal to the plane of rotation, i.e. in direction 12.14, with a resilient member 12.12, for example a spring, causing knob 12.2 to return to a resting position if pressed and released. A supporting structure 12.4 keeps knob 12.2, axle 12.5, metal disk 12.6, diametrically polarized permanent magnet 12.7 and spring 12.12 in position external to enclosure 12.3. Metal disk 12.6 may for example be fashioned out of aluminium. An inductive structure 12.8, for example a coil, and an integrated circuit 12.9, with interconnects or pins 12.10, may be located internal to enclosure 12.3, and may be placed in close proximity to metal disk 12.6 and magnet 12.7. According to the present invention, coil 12.8 may be connected to integrated circuit 12.9 (connection not illustrated), allowing integrated circuit 12.9 to measure the inductance of the coil, for example with charge transfer measurement circuitry. Further, integrated circuit 12.9 may comprise magnetically sensitive members, for example a Hall-plate structure or structures, to measure magnetic fields of magnet 12.7 and the absolute or relative rotation thereof. Therefore, when a user turns knob 12.2 in direction 12.13, and therefore also magnet 12.7, integrated circuit 12.9 may measure the amount of rotation, in an absolute or relative sense, using said magnetically sensitive members. The amount of knob rotation may be calculated by integrated circuit 12.9 and communicated to other circuitry (not shown), for example using interconnects 12.10, which may comprise the one or other digital bus such as I$^2$C or SPI etc. Alternatively, the raw magnetic field values may be communicated via interconnects 12.10 to other circuitry (not shown) for rotation calculation. When a user presses/releases knob 12.2 in a direction 12.14, metal member 12.6 should move accordingly. As is known in the art, when a metal member moves closer to a coil structure, eddy current losses may increase, affecting the measured inductance value of the coil. Thus, by measuring the inductance of coil 12.8, for example by using charge transfer measurements, integrated circuit 12.9 may detect when knob 12.2 is pressed or released, due to an increase or decrease in eddy current losses caused by the movement of metal disk 12.6 along direction 12.14. In the preceding manner, integrated circuit 12.9 may be used to measure both the rotation and press/release of knob 12.2, even-though said knob is situated on the other side of enclosure wall 13.15. It is to be appreciated that the rotation of knob 12.2 may be measured in absolute terms, i.e. in degrees, but that the UI may offer relative rotation, i.e. it does not matter where the start position of said knob is, only how far it is turned. To this end, enclosure 12.3 may incorporate indicators 12.11 in a circular format around knob 12.2, which may be used to indicate a relative starting point to a user, as well as how far said knob has been turned.

In the exemplary embodiment depicted by FIG. 12 and FIG. 13, metal member 12.6 may typically be fashioned out of aluminium. As such, it is permeable to low frequency magnetic fields, for instance those generated by permanent magnet 12.6, allowing said fields to reach integrated circuit 12.9 and the magnetically sensitive members within. Further, although coil 12.8 and metal member 12.6 are illustrated in FIG. 12 and FIG. 13 as being in proximity to integrated circuit 12.9 and in line with axle 12.5 of the knob, this need not be the case. The coil and metal member may be located away from said integrated circuit and axle, with the only requirement being that the metal member should move closer to the coil when knob 12.2 is pressed.

Figure 14:
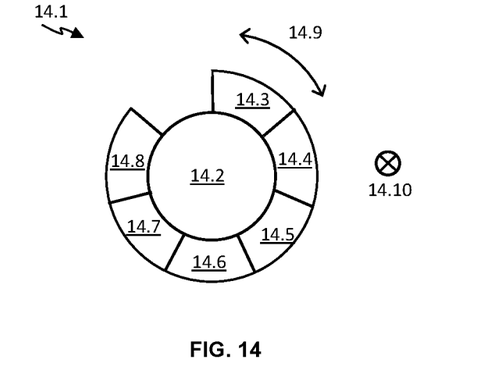
FIG. 14 shows a top view of a user-interface knob embodiment.

A top view of a UI knob as disclosed above is presented at 14.1 in FIG. 14, wherein the knob may be rotated forwards and backwards along direction 14.9 and pressed along direction 14.10 by a user. The symbol at 14.10 indicates a direction into the page. According to the present invention, a UI with distinct advantages may be facilitated by a knob as presented in exemplary manner in FIGS. 12 to 14. As an example, consider an embodiment where, from a switch-off, low-power or powered-down state, and during a first press-event, a user presses knob 14.2 once, or a number of times, or according to the one or other time-based pattern, along direction 14.10. This may cause said UI to wake-up or activate. Said wake-up or activation may be indicated to the user. The UI may accordingly wake a load controlled by said UI, or cause it to transition from an off-state to an on-state or an energized-state. Subsequently, the user may turn knob 14.2 along direction 14.9, with the amount of rotation measured as disclosed earlier, stored in memory, and indicated to the user, for instance by lighting a specific number of LED's in a circular array of LED's. A load may be controlled by said UI according to said amount of rotation. For example, consider the case where the user turns knob 14.2 all the way from minimum value starting position 14.3 to position 14.8, thereby passing positions 14.4 to 14.7. Said UI may provide indication as each of the positions 14.3 to 14.8 is passed or reached by knob 14.2, for example by activating an LED at each of the positions. According to the UI of the invention, when knob 14.2 is pressed again along direction 14.10 during a second press-event, it may be interpreted by the UI as a switch-off command, with said UI-controlled load which may then be switched-off, and the off status indicated to the user. Subsequently, if the user presses knob 14.2 again along direction 14.10 during a third press event, the UI may switch-on or reactivate, and immediately return to the previously stored knob rotation position, for example 14.8 and control said load accordingly. Or, according to another exemplary embodiment of the present invention, when user presses knob 14.2 again along direction 14.10 during said third press event, the UI may switch-on or reactivate, but return to a zero or minimum rotation angle position, for example to the minimum value rotation position 14.3, and control said load accordingly.

The invention claimed is:

1. A user interface comprising a knob and an integrated circuit for monitoring said knob, said integrated circuit comprising a magnetic field sensor and circuitry for measuring the inductance of a structure, and wherein a permanent magnet and a metal member are attached to said knob, with rotation of said knob detected by the magnetic field sensor due to corresponding rotation of said magnet, wherein a user press on said knob is detected by the circuitry for measuring the inductance of the structure due to corresponding movement of said metal member relative to said structure, and wherein from a low-power state, a first press event for said knob is interpreted as an activation command by said integrated circuit, a subsequent rotation of said knob from a starting rotational position to a first rotational position is detected and stored by the integrated circuit; wherein a second press event for said knob is interpreted by the integrated circuit as a deactivation command, and wherein a third press event for said knob is interpreted by the integrated circuit as a command to reactivate and to set the knob rotational position to one of the following:
   a minimum value rotational position;
   said stored first rotational position; and
   a predetermined rotational position.

2. The user interface of claim 1, wherein a power level of a load is controlled according to the rotational position of said knob.

3. The user interface of claim 1, wherein functionality or a configuration of an electronic device is controlled according to the rotational position of said knob.

4. The user interface of claim 1, wherein both the magnetic field sensor and the circuitry for measuring the inductance of said structure comprise charge transfer circuitry.

5. The user interface of claim 4, wherein current mirror structures and parasitic removal circuitry are utilized to compensate for drift in signals from said magnetic field sensor and/or from said circuitry for measuring the inductance of said structure.

6. The user interface of claim 4, wherein current mirror structures and parasitic removal circuitry are utilized to compensate for signal deviation due to manufacturing tolerances.

7. The user interface of claim 1, wherein indicators are controlled by the integrated circuit, with said indicators providing indication of at least one of the following:
   an activated state;
   a deactivated state; and
   a rotational position of said knob.

8. The user interface of claim 1 implemented with a sealed enclosure, wherein said knob, magnet and metal member are located external to the enclosure, and said integrated circuit and structure are located inside the enclosure.

9. A user interface comprising a knob and an integrated circuit for monitoring said knob, said integrated circuit comprising a magnetic field sensor and circuitry for measuring the inductance of a structure, and wherein a permanent magnet and a metal member are attached to said knob, with rotation of said knob detected by the magnetic field sensor due to corresponding rotation of said magnet, wherein a user press on said knob is detected by the circuitry for measuring the inductance of the structure due to corresponding movement of said metal member relative to said structure, and wherein from a low-power state, a rotation of said knob from a starting rotational position to a first rotational position is detected by the integrated circuit; wherein said first rotational position is stored; wherein a first press event for said knob is interpreted by the integrated circuit as an activation command to energize a load at a level corresponding to said stored first rotational position; wherein a second press event for said knob is interpreted by the integrated circuit as a command to deactivate said load, and wherein a third press event for said knob is interpreted by the integrated circuit as a command to reactivate and to set the knob rotational position and a corresponding load consumption level to one of the following:
   a minimum value rotational position;
   said stored first rotational position; and
   a predetermined rotational position.

10. The user interface of claim 9, wherein said load is an electronic device and wherein functionality or a configuration of the device is controlled according to the rotational position of said knob.

11. The user interface of claim 9, wherein both the magnetic field sensor and the circuitry for measuring the inductance of said structure comprise charge transfer circuitry.

12. The user interface of claim 11, wherein current mirror structures and parasitic removal circuitry are utilized to compensate for drift in signals from said magnetic field sensor and/or from the circuitry for measuring the inductance of said structure.

13. The user interface of claim 11, wherein current mirror structures and parasitic removal circuitry are utilized to compensate for signal deviation due to manufacturing tolerances.

14. The user interface of claim 9, wherein indicators are controlled by the integrated circuit, with said indicators providing indication of at least one of the following:
   an activated state;
   a deactivated state;
   a rotational position of said knob; and
   a load status.

15. The user interface of claim 9 implemented with a sealed enclosure, wherein said knob, magnet and metal member are located external to the enclosure, and said integrated circuit and structure are located inside the enclosure.

* * * * *